US011499067B2

(12) United States Patent
Takahashi et al.

(10) Patent No.: US 11,499,067 B2
(45) Date of Patent: Nov. 15, 2022

(54) RESIN COMPOSITION, RESIN-COATING MATERIAL, VEHICLE WIRE HARNESS AND METHOD OF PRODUCING VEHICLE WIRE HARNESS

(71) Applicants: FURUKAWA ELECTRIC CO., LTD., Tokyo (JP); FURUKAWA AUTOMOTIVE SYSTEMS INC., Shiga (JP)

(72) Inventors: Kenji Takahashi, Tokyo (JP); Yuka Sawada, Tokyo (JP); Takashi Oshino, Tokyo (JP); Yutaka Suzuki, Tokyo (JP); Yasuharu Uchiyama, Inukami-gun (JP); Hideyuki Osuga, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 554 days.

(21) Appl. No.: 16/683,744

(22) Filed: Nov. 14, 2019

(65) Prior Publication Data
US 2020/0079969 A1 Mar. 12, 2020

Related U.S. Application Data

(63) Continuation of application No. PCT/JP2018/025221, filed on Jul. 3, 2018.

(30) Foreign Application Priority Data

Jul. 5, 2017 (JP) .............................. JP2017-131953

(51) Int. Cl.
| B29C 35/08 | (2006.01) |
| C09D 123/08 | (2006.01) |
| B29C 48/154 | (2019.01) |
| B60R 16/02 | (2006.01) |
| C08K 13/02 | (2006.01) |
| C08L 23/08 | (2006.01) |
| H01B 3/44 | (2006.01) |
| H01B 7/295 | (2006.01) |
| H01B 13/012 | (2006.01) |
| H01B 13/14 | (2006.01) |
| B29K 23/00 | (2006.01) |
| B29K 105/00 | (2006.01) |
| B29K 105/24 | (2006.01) |
| B29L 31/34 | (2006.01) |

(52) U.S. Cl.
CPC .... *C09D 123/0853* (2013.01); *B29C 35/0866* (2013.01); *B29C 48/154* (2019.02); *B60R 16/0215* (2013.01); *C08K 13/02* (2013.01); *C08L 23/0853* (2013.01); *H01B 3/44* (2013.01); *H01B 7/295* (2013.01); *H01B 13/01209* (2013.01); *H01B 13/145* (2013.01);

*B29C 2035/0877* (2013.01); *B29K 2023/083* (2013.01); *B29K 2105/0026* (2013.01); *B29K 2105/0044* (2013.01); *B29K 2105/0085* (2013.01); *B29K 2105/24* (2013.01); *B29L 2031/3462* (2013.01)

(58) Field of Classification Search
CPC .................................................. B29K 2023/083
See application file for complete search history.

(56) References Cited

U.S. PATENT DOCUMENTS

| 2002/0033272 A1 | 3/2002 | Hashimoto et al. |
| 2012/0273268 A1 | 11/2012 | Shimada et al. |
| 2013/0008691 A1 | 1/2013 | Shimada et al. |
| 2017/0004906 A1 | 1/2017 | Tanaka et al. |

FOREIGN PATENT DOCUMENTS

| CN | 103450542 A | 12/2013 |
| CN | 106463206 A | 2/2017 |
| EP | 2 805 994 A1 | 11/2014 |
| JP | 7-52223 A | 2/1995 |
| JP | 2000-129064 A | 5/2000 |
| JP | 2002-42574 A | 2/2002 |
| JP | 2002-128963 A | 5/2002 |
| JP | 2008-150532 A | 7/2008 |
| JP | 2009-7463 A | 1/2009 |
| JP | 2009-51918 A | 3/2009 |
| JP | 2009-54388 A | 3/2009 |
| JP | 2009-286903 A | 12/2009 |
| JP | 2011-168697 A | 9/2011 |
| JP | 2011-219530 A | 11/2011 |
| JP | 2013-147586 A | 8/2013 |
| JP | 2015-40266 A | 3/2015 |
| WO | WO 2013/108919 A1 | 7/2013 |
| WO | WO 2015/159788 A1 | 10/2015 |

OTHER PUBLICATIONS

Chinese Office Action and Search Report for corresponding Chinese Application No. 201880039057.9, dated Oct. 12, 2021, with an English translation.
International Search Report for PCT/JP2018/025221 dated Oct. 9, 2018.
Office Action for JP 2017-131953 dated Aug. 8, 2017.

*Primary Examiner* — James Sanders
(74) *Attorney, Agent, or Firm* — Birch, Stewart, Kolasch & Birch, LLP

(57) ABSTRACT

A resin composition, containing an ethylene-vinyl acetate copolymer (A); and 15 to 30 mass parts of a bromine-based flame retardant (B), 5 to 15 mass parts of antimony trioxide (C), 6 to 12 mass parts of a benzimidazole-based aging retardant (D), 2 to 4 mass parts of a phenol-based aging retardant (E), 2 to 4 mass parts of a thioether-based aging retardant (F), 0.5 to 2 mass parts of a copper inhibitor (G), and 3 to 6 mass parts of a crosslinking aid (H), with respect to 90 to 100 mass parts of the ethylene-vinyl acetate copolymer (A);
 a vehicle wire harness; and,
 a method of producing a vehicle wire harness.

12 Claims, No Drawings

RESIN COMPOSITION, RESIN-COATING MATERIAL, VEHICLE WIRE HARNESS AND METHOD OF PRODUCING VEHICLE WIRE HARNESS

CROSS-REFERENCE TO RELATED APPLICATIONS

This application is a Continuation of PCT International Application No. PCT/JP2018/025221 filed on Jul. 3, 2018, which claims priority under 35 U.S.C. § 119 (a) to Japanese Patent Application No. 2017-131953 filed in Japan on Jul. 5, 2017. Each of the above application is hereby expressly incorporated by reference, in its entirely, into the present application.

TECHNICAL FIELD

The present invention relates to a resin composition, a resin-coating material, a vehicle wire harness and a method of producing a vehicle wire harness.

BACKGROUND ART

Insulated wires with flame retardancy are widely used for various kinds of white goods (house appliance) and OA equipment, etc. Further, characteristics such as flame retardancy and heat resistance are also required for the insulated wires used in automobiles and the like. In the past, resin compositions for realizing insulated wires with flame retardancy and heat resistance by using them as a coating material for the conductor have been studied and many reports thereon have been published.

For example, Patent Literature 1 describes a flame retardant resin composition that, when used as a coating material for the conductor, can obtain an insulated wire that is excellent in heat-resistant life, flame retardancy, and coexistence (compatibility) with polyvinyl chloride (PVC) and that does not cause problems such as elution of heavy metal compounds and generation of a lot of smoke and corrosive gasses at the time of disposal such as landfill and incineration. The forgoing flame retardant resin composition contains, with respect to 100 mass parts of an ethylene-vinyl acetate copolymer or a mixture of the ethylene-vinyl acetate copolymer and a polyolefin, whose vinyl acetate content is 10 mass % or more and less than 40 mass %, from 50 to 160 mass parts of a metal hydrate, from 2 to 10 mass parts of a phenol-based antioxidant, from 10 to 25 mass parts of a benzimidazole-based antioxidant, and from 0 to 10 mass parts of a thioether-based antioxidant.

Patent Literature 2 describes a resin composition that, when used as a coating material for the conductor, can obtain an insulated wire that is excellent in heat-resistance, mechanical characteristics, flame retardancy, and appearance. This resin composition contains, with respect to 100 mass parts of a resin component composed of a polyolefin-based resin and/or an ethylene-based copolymer composed of ethylene and a substituted ethylene, from 10 to 100 mass parts of a thioether-based antioxidant and from 10 to 120 mass parts of a benzimidazole-based antioxidant. Patent Literature 3 describes a resin composition that, when used as a coating material for the conductor, can obtain an insulated wire that exhibits high flame retardancy, low temperature property and heat aging resistance. This resin composition contains, with respect to 100 mass parts of a resin component mainly composed of an ethylene-based copolymer, from 15 to 80 mass parts of a bromine-based retardant excluding polybromophenylether and polybromobiphenyl, from 10 to 70 mass parts of an antimony trioxide, and from 10 to 60 mass parts of a metal hydrate.

Patent Literature 4 describes a composition for an insulated wire-coating material that, when used as a coating material for the conductor, can obtain an insulated wire that is excellent in heat resistance and mechanical characteristics. This composition for an insulated wire-coating material contains a water-crosslinkable polyolefin in which the polyolefin is modified by a silane coupling agent, an unmodified polyolefin, a modified polyolefin that is modified by a functional group, a flame retardant including a bromine-based flame retardant, a crosslinking catalyst, and further contains a phenolic antioxidant, and either one of a zinc sulfide, and a zinc oxide and an imidazole compound. Patent Literature 5 describes an insulating resin composition that, when used as a coating material for the conductor can obtain an insulated wire that is excellent in flexibility, water cut-off performance and heat resistance. This insulating resin composition contains two kinds of specific copolymers and a flame retardant at a specific rate.

CITATION LIST

Patent Literatures

Patent Literature 1: JP-A-2009-286903 ("JP-A" means unexamined published Japanese patent application)
Patent Literature 2: JP-A-2015-40266
Patent Literature 3: JP-A-2009-51918
Patent Literature 4: JP-A-2011-168697
Patent Literature 5: WO 2015/159788 A1

SUMMARY OF INVENTION

Technical Problem

With the recent progress of development of hybrid vehicles etc., insulated wires used for automobiles etc. are required to have more excellent characteristics in terms of flexibility, hardness, degree of cross-linkage, abrasion resistance, flame retardance, cold resistance, and heat resistance etc. than ever before. For example, taking the heat resistance as an example, a demand for insulated wires meeting the Japan Automotive Standards Organization (JASO) standard D 624 (2015) heat resistance class 150° C., or ISO 6722 (2006) heat resistance class D is increasing.

In view of the above-described situation, the present invention is contemplated for providing a resin composition that, by using it for forming a resin-coating material layer of the insulated wire, can obtain an insulated wire exhibiting desired excellent characteristics in all of flexibility, hardness, degree of cross-linkage, abrasion resistance, flame retardance, cold resistance, and heat resistance, and that is also excellent in processing efficiency. Further, the present invention is contemplated for providing a resin-coating material that, by using it for a coating material of the conductor etc., can realize an insulated wire exhibiting desired excellent characteristics in all of flexibility, hardness, degree of cross-linkage, abrasion resistance, flame retardance, cold resistance, and heat resistance. Further, the present invention is contemplated for providing a vehicle wire harness having a layer composed of the forgoing resin-coating material and a method of producing the vehicle wire harness.

Solution to Problem

The present inventors found, as a result of their studies to solve the above-described problems, that when a resin composition containing an ethylene-vinyl acetate copolymer, a specific flame retardant, multiple types of specific aging retardant, a copper inhibitor, and a crosslinking aid at each specific amount was prepared, said resin composition was difficult to adhere to a processing machine (said resin composition was excellent in processing adhesion) in the preparation of this resin composition, whereby it was possible to reduce an amount of the resin composition remaining in the processing machine, and further by applying the resin composition to the surface of a conductor etc., and by crosslinking said resin composition, it was possible to obtain an insulated wire exhibiting desired excellent characteristics in all of flexibility, hardness, degree of cross-linkage, abrasion resistance, flame retardance, cold resistance, and heat resistance. The present invention was completed on the basis of these findings.

The above-described problems of the present invention are solved by the following means.

<1>
A resin composition, containing:
an ethylene-vinyl acetate copolymer (A); and
15 to 30 mass parts of a bromine-based flame retardant (B), 5 to 15 mass parts of antimony trioxide (C), 6 to 12 mass parts of a benzimidazole-based aging retardant (D), 2 to 4 mass parts of a phenol-based aging retardant (E), 2 to 4 mass parts of a thioether-based aging retardant (F), 0.5 to 2 mass parts of a copper inhibitor (G), and 3 to 6 mass parts of a crosslinking aid (H), with respect to 90 to 100 mass parts of the ethylene-vinyl acetate copolymer (A).

<2>
The resin composition described in the above item <1>, containing 1 to 10 mass parts of a maleic acid-modified polyethylene (I).

<3>
The resin composition described in the item <1> or <2>, which is used for a vehicle wire harness.

<4>
A resin-coating material is obtained by crosslinking the resin composition described in any one of the items <1> to <3>.

<5>
A vehicle wire harness, containing a layer composed of the resin-coating material described in the item <4>.

<6>
A method of producing of a vehicle wire harness, which contains a step of irradiating electron beams of 80 to 250 kGy to a resin composition; wherein the resin composition contains from 90 to 100 mass parts of an ethylene-vinyl acetate (A), from 15 to 30 mass parts of a bromine-based flame retardant (B), from 5 to 15 mass parts of antimony trioxide (C), from 6 to 12 mass parts of a benzimidazole-based aging retardant (D), from 2 to 4 mass parts of a phenol-based aging retardant (E), from 2 to 4 mass parts of a thioether-based aging retardant (F), from 0.5 to 2 mass parts of a copper inhibitor (G), and from 3 to 6 mass parts of a crosslinking aid (H).

Advantageous Effects of Invention

The resin composition of the present invention is excellent in processing adhesion, and by using it for a coating material of the insulated wire, it is possible to obtain an insulated wire exhibiting desired excellent characteristics in all of flexibility, hardness, degree of cross-linkage, abrasion resistance, flame retardance, cold resistance, and heat resistance. With the resin-coating material of the present invention, by using it as a coating material of a conductor etc., it is possible to obtain an insulated wire exhibiting desired excellent characteristics in all of flexibility, hardness, degree of cross-linkage, abrasion resistance, flame retardance, cold resistance, and heat resistance. The vehicle wire harness of the present invention has a layer composed of the resin-coating material of the present invention and exhibits desired excellent characteristics in all of flexibility, hardness, degree of cross-linkage, abrasion resistance, flame retardance, cold resistance, and heat resistance. According to the method of producing the vehicle wire harness of the present invention, a vehicle wire harness having the above-described excellent properties can be obtained.

MODE FOR CARRYING OUT THE INVENTION

<Resin Compound>

The resin composition of the present invention contains, as a flame retardant, 15 to 30 mass parts of a bromine-based flame retardant (B) and 5 to 15 mass parts of antimony trioxide (C), with respect to 90 to 100 mass parts of an ethylene-vinyl acetate copolymer (A). Further, the resin composition contains, as an aging retardant, 6 to 12 mass parts of a benzimidazole-based aging retardant (D), 2 to 4 mass parts of a phenol-based aging retardant (E), and 2 to 4 mass parts of a thioether-based aging retardant (F). Further, the resin composition contains 0.5 to 2 mass parts of a copper inhibitor (G), and 3 to 6 mass parts of a crosslinking aid (H). Hereinafter, the vehicle wire harness may be referred to simply as "wire harness" in several cases. Further, each component may be described without a code in several cases. For example, the ethylene-vinyl acetate copolymer (A) may be described simply as "ethylene-vinyl acetate copolymer" in several cases.

Meanwhile, all of the components contained in the resin composition of the present invention including optional components described below may be used alone, or in combination of two or more kinds.

(Ethylene-Vinyl Acetate Copolymer (A))

The resin composition of the present invention contains from 90 to 100 mass parts of the ethylene-vinyl acetate copolymer (A). If the content of the ethylene-vinyl acetate copolymer (A) is less than 90 mass parts, this causes lowering in both degree of cross-linkage and flame retardance of the insulated wire. On the other hand, if the content of the ethylene-vinyl acetate copolymer (A) exceeds 100 mass parts, excellent flexibility of the insulated wire can be kept, but processing adhesion and mechanical strength are lowered. The polymerization form of the ethylene-vinyl acetate copolymer used in the present invention may be any of block polymerization, random polymerization and graft polymerization. The content by percentage of a vinyl acetate component of the ethylene-vinyl acetate copolymer is preferably from 10 to 30 mass %, and particularly preferably from 10 to 20 mass %. When the content by percentage of the vinyl acetate component is within the above-described range, while the resin-coating material prepared using the resin composition of the present invention keeps a sufficient flexibility, the resin composition is difficult to adhere to a processing machine (the resin composition is excellent in processing adhesion), so that an amount of the composition remaining in the processing machine can be lowered, and also flame retardancy of the insulated wire is more improved. Meanwhile, the content by percentage of the vinyl acetate component can be measured, for example, from a mass ratio of the raw materials (monomers) in the time of synthesis.

The ethylene-vinyl acetate copolymer for use in the present invention can be synthesized in accordance with an ordinarily method. Alternatively, a commercially available product may be used. Examples of the commercially available product include EVAFLEX V5274, EVAFLEX V422 and EVAFLEX EV40LX (each trade name) manufactured by DUPONT-MITSUI POLYCHEMICALS CO., LTD.

The melt flow rate (MFR) of the ethylene-vinyl acetate copolymer is preferably 0.1 to 10 g/10 min (load: 2.16 kg, temperature: 190° C.), more preferably 0.5 to 5 g/10 min.

When using an ethylene-vinyl acetate copolymer with too low melt-flow rate, the load of a kneader or an extruder may increase at the time of preparation of the resin composition or at the time of production of the wire harness in several cases.

On the other hand, when using an ethylene-vinyl acetate copolymer with too high melt-flow rate, the load of the extruder that is a forming apparatus of the wire harness is lowered, but dispersibility of each component in the resin composition may be decreased in several cases.

(Bromine-Based Flame Retardant (B))

The resin composition of the present invention contains 15 to 30 mass parts of a bromine-based flame retardant (B). If the content of the bromine-based flame retardant (B) is less than 15 mass parts, sufficient flame retardance of the insulated wire cannot be obtained. On the other hand, if the content of the bromine-based flame retardant (B) exceeds 30 mass parts, flexibility, cold resistance, and mechanical strength of the insulated wire are reduced, or heat resistance and abrasion resistance thereof are reduced.

The bromine-based flame retardant used in the present invention is a bromine-containing compound. That is, the resin composition of the present invention contains a bromine-containing compound as a flame retardant. However, the bromine-based flame retardant used in the present invention should not contain polybromophenylether and polybromobiphenyl. As the bromine-based flame retardant, use can be made of, for example, organic bromine-containing flame retardant such as a brominated N,N'-ethylene bisphthalimide or compounds derived therefrom (these are collectively called "a brominated N,N'-ethylene bisphthalimide compound"), N,N'-bis(bromophenyl)terephthalamide or compounds derived therefrom (these are collectively called "a N,N'-bis(bromophenyl) terephthalamide compound"), a brominated bisphenol or compounds derived therefrom (these are collectively called "a brominated bisphenol compound"), and 1,2-bis(bromophenyl) alkane. Above all, for example, a brominated N,N'-ethylene bisphthalimide represented by the following structural formula 1, and/or 1,2-bis(bromophenyl)ethane represented by the following structural formula 2 are preferably used.

By using the brominated N,N'-ethylene bisphthalimide, and/or 1,2-bis(bromophenyl)alkyl as a flame retardant, a resin-coating material that hardly causes blooming can be formed.

Meanwhile, when using polybromophenylether or polybromobiphenyl as a flame retardant, there is a possibility that blooming is intensely caused and therefore this use is avoided in the present invention. Further, even when using a chlorine-based flame retardant, there is also a possibility that the same blooming problem is caused and therefore it is preferable for the resin composition of the present invention not to contain the chlorine-based flame retardant.

{Formula 1}

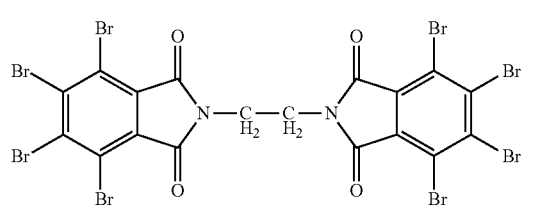

Structural Formula 1

{Formula 2}

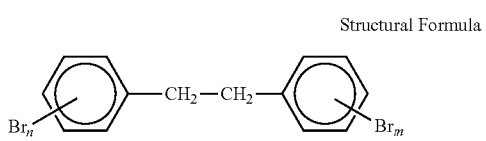

Structural Formula 2

(In Formulas, m and n Each are in Integer of 1 to 5.)

In the present invention, a commercially available bromine-based flame retardant may be used. Examples of the commercially available product include SAYTEX 8010 (trade name) manufactured by Albemarle Corporation.

(Antimony Trioxide (C))

The resin composition of the present invention contains 5 to 15 mass parts of antimony trioxide (C). If the content of the antimony trioxide (C) is less than 5 mass parts, flame retardancy of the insulated wire is remarkably lowered. If the content of the antimony trioxide (C) is more than 15 mass parts, flexibility, low temperature property, mechanical characteristics of the insulated wire are lowered, and heat resistance and abrasion resistance are reduced.

In the present invention, a commercially available antimony trioxide may be used. Examples of the commercially available include PATOX-C (trade name) manufactured by Nihon Seiko Co., Ltd.

(Benzimidazole-Based Aging Retardant (D))

The resin composition of the present invention contains 6 to 12 mass parts of a benzimidazole-based aging retardant (D) (benzimidazole-based antioxidant (D)). That is, the resin composition of the present invention contains a specific amount of a benzimidazole compound (compound having a benzimidazole skeleton) as an aging retardant. If the content of the benzimidazole-based aging retardant (D) is less than 6 mass parts, heat resistance of the insulated wire is remarkably lowered. On the other hand, if the content of the benzimidazole-based aging retardant (D) exceeds 12 mass parts, flame retardancy of the insulated wire is remarkably lowered, and abrasion resistance is reduced.

Examples of the benzimidazole-based aging retardant include 2-sulfanyl benzimidazole, 2-sulfanyl methylbenzimidazole, 4-sulfanyl methylbenzimidazole, 5-sulfanyl methylbenzimidazole, and zinc salts of these. Among these, 2-sulfanyl benzimidazole is preferable.

In the present invention, a commercially available benzimidazole-based aging retardant may be used. Examples of the commercially available product include NOCRAC MBZ (trade name) manufactured by Ouchi Shinko Chemical Industrial Co., Ltd.

(Phenol-Based Aging Retardant (E))

The resin composition of the present invention contains 2 to 4 mass parts of a phenol-based aging retardant (E)

(phenol-based antioxidant (E)). That is, the resin composition of the present invention contains a specific amount of a phenol compound (compound having a phenol skeleton) as an aging retardant. If the content of the phenol-based aging retardant (E) is less than 2 mass parts, heat resistance of the insulated wire is remarkably lowered. On the other hand, if the content of the phenol-based aging retardant (E) is more than 4 mass parts, flame retardancy and abrasion resistance of the insulated wire is lowered, or blooming is caused in the insulated wire.

Examples of the phenol-based aging retardant include triethyleneglycol-bis(3-(3-t-butyl-5-methyl-4-hydroxyphenyl)propionate), 1,6-hexanediol-bis(3-(3,5-di-t-butyl-4-hydroxyphenyl)propionate), pentaerythrityl-tetrakis(3-(3,5-di-t-butyl-4-hydroxyphenyl)propionate), octadecyl-3-(3,5-di-t-butyl-4-hydroxyphenyl)propionate, 1,3,5-trimethyl-2,4,6-tris(3,5-di-t-butyl-4-hydroxybenzyl)benzene, tris-(3,5-di-t-butyl-4-hydroxybenzyl)isocyanurate, and isooctyl-3-(3,5-di-t-butyl-4-hydroxyphenyl)propionate. Above all, from the viewpoint of giving high heat resistance to the vehicle wire harness, those having at least two of 3,5-di-t-butyl-4-hydroxyphenyl groups or 3,5-di-t-butyl-4-hydroxybenzyl groups are preferable; and tris-(3,5-di-t-butyl-4-hydroxybenzyl)-isocyanurate and pentaerythrityl-tetrakis(3-(3,5-di-t-butyl-4-hydroxyphenyl)propionate) are particularly preferable.

In the present invention, a commercially available phenol-based aging retardant may be used. Examples of the commercially available product include Irganox 1010 (trade name) manufactured by BASF.

(Thioether-Based Aging Retardant (F))

The resin composition of the present invention contains 2 to 4 mass parts of a thioether-based aging retardant (F) (thioether-based antioxidant (F)). That is, the resin composition of the present invention contains a specific amount of a thioether compound (compound having a thioether bond) as an aging retardant. If the content of the thioether-based aging retardant (F) is less than 2 mass parts, flame retardancy of the insulated wire is remarkably lowered. On the other hand, if the content of the thioether-based aging retardant (F) exceeds 4 mass parts, flame retardancy and abrasion resistance of the insulated wire are reduced, or blooming is caused in the insulated wire.

Examples of the thioether-based aging retardant include dilauryl 3,3'-thiodipropionate, dimyristyl 3,3'-thiodipropionate, distearyl 3,3'-thiodipropionate, and pentaerythritol tetrakis(3-laurylthiopropionate). Above all, from the viewpoint of giving high heat resistance to the composition and insulating wire, pentaerythritol tetrakis(3-laurylthiopropionate) is preferable.

In the present invention, a commercially available thioether-based aging retardant may be used. Examples of the commercially available product include ADKSTAB AO-412S (trade name) manufactured by ADEKA Corporation.

Combination of the benzimidazole-based aging retardant, the phenol-based aging retardant and the thioether-based aging retardant allows further improvement in the heat resistance, the flame retardancy and the abrasion resistance of the resin-coating material of the present invention or the insulated wire having a layer composed of said resin-coating material.

(Copper Inhibitor (G))

The resin composition of the present invention contains 0.5 to 2 mass parts of a copper inhibitor (G) (metal-inactivating agent (G)). If the content of the copper inhibitor (G) is less than 0.5 mass parts, oxidation degradation-suppressing capabilities of the aging retardant is lowered by contact with metal ions such as copper, whereby heat resistance of the insulated wire is lowered. On the other hand, if the content of the copper inhibitor (G) exceeds 2 mass parts, flame retardancy of the insulated wire may be lowered in several cases.

Examples of the copper inhibitor (G) include triazole-based compounds, N,N'-diacylhydrazine compounds, and dihydrazide compounds. Examples of the copper inhibitor (G) include a heavy metal deactivator ADEKA STAB CDA series, manufactured by ADEKA Corporation. Specific examples thereof include CDA-1, CDA-6 and CDA-10 (each trade name). Another examples thereof include IRGANOX MD1024 (trade name) manufactured by BASF. From the viewpoints of having a high heat resistance improvement effect etc., particularly preferable ones are CDA-10 {N,N-bis[3-(3,5-t-butyl-4-hydroxyphenyl)propionyl]hydrazine} and IRGANOX MD1024.

(Crosslinking Aid (H))

The resin composition of the present invention contains 3 to 6 mass parts of a crosslinking aid (H). If the content of the crosslinking aid (H) is less than 3 mass parts, crosslinking does not proceed sufficiently, whereby mechanical strength, flame retardancy, and heat resistance of the insulated wire are lowered. On the other hand, if the content of the crosslinking aid (H) exceeds 6 mass parts, the crosslinking density increases, whereby flexibility of the insulated wire decreases. Further, at the time of preparing a resin composition, the composition tends to slip in a processing machine, which results in taking a mixing time to disperse the composition.

In the present invention, a commercially available crosslinking aid may be used. Examples of the commercially available product include Ogmont T200 (trade name) manufactured by Shin-Nakamura Chemical Co., Ltd.

(Maleic Acid-Modified Polyethylene (I))

The resin composition of the present invention preferably contains 1 to 10 mass parts of a maleic acid-modified polyethylene (I). The content is more preferably 5 to 10 mass parts. By the content of the maleic acid-modified polyethylene (I) being within the above-described range, an insulated wire having a resin-coating material prepared by using the resin composition of the present invention has a sufficient flexibility. Further, because the resin composition is hard to adhere to a processing machine (the resin composition is excellent in processing adhesion), an amount of the resin composition remaining in the processing machine can be suppressed. And also, by increase in compatibility of a resin and fillers in the composition, abrasion resistance of the insulated wire is more improved.

(Additive)

In the resin composition of the present invention, various additives, for example, a lubricant, an ultraviolet absorber, a dispersant, a plasticizer, a filler and pigment etc. may be appropriately blended as needed in a range that the effects of the present invention is not impaired. Examples of such an additive include zinc compounds. Examples of the zinc compound include zinc sulfide and zinc oxide. The content of the lubricant in the resin composition of the present invention is preferably 0.5 to 2 mass parts.

The resin composition of the present invention may contain a metal hydrate, such as aluminum hydroxide and magnesium hydroxide, or the like. The content thereof is preferably 5 mass parts or less, and more preferably 3 mass parts or less, with respect to 90 to 100 mass parts of the ethylene-vinyl acetate copolymer (A). This is because if the content of the metal hydrate is too high, flexibility, abrasion resistance, mechanical strength, and cold resistance of the insulated wire are lowered.

The composition of the present invention contains a resin. The composition of the present invention preferably contains, with respect to 100 mass parts of the resin, 15 to 30 mass parts of the bromine-based flame retardant (B) and 5 to 15 mass parts of antimony trioxide (C) as the flame retardant; 6 to 12 mass parts of the benzimidazole-based aging retardant (D), 2 to 4 mass parts of the phenol-based aging retardant (E), and 2 to 4 mass parts of the thioether-based aging retardant (F), as an aging retardant; 0.5 to 2 mass parts of the copper inhibitor (G); and 3 to 6 mass parts of the crosslinking aid (H).

In the composition of the present invention, the resin contains the ethylene-vinyl copolymer (A). The resin preferably contains a maleic acid-modified polyethylene, and may contain a low density polyethylene.

The content of the ethylene-vinyl acetate copolymer (A) in above-described resin is from 90 to 100 mass %.

The resin is preferably composed of (1) an ethylene-vinyl acetate copolymer, (2) a combination of an ethylene-vinyl acetate copolymer and a maleic acid-modified polyethylene, or (3) a combination of an ethylene-vinyl acetate copolymer, a maleic acid-modified polyethylene and a low density polyethylene.

In the above item (2), the content of the maleic acid-modified polyethylene in the resin is preferably 1 to 10 mass %. In the above item (3), the total amount of the maleic acid-modified polyethylene and the low density polyethylene in the resin is preferably 1 to 10 mass %.

Specifically, the composition of the present invention is preferably a resin composition for a resin-coating material layer of an insulated wire, in which:

the composition contains a resin, a flame retardant, an aging retardant, a copper inhibitor and a crosslinking aid;

the resin is composed of (1) an ethylene-vinyl acetate copolymer, (2) a combination of an ethylene-vinyl acetate copolymer and a maleic acid-modified polyethylene, or (3) a combination of an ethylene-vinyl acetate copolymer, a maleic acid-modified polyethylene and a low density polyethylene;

when the total amount of the resin is taken as 100 mass parts, the content of the ethylene-vinyl acetate copolymer is from 90 to 100 mass parts, and the content of the maleic acid-modified polyethylene is 1 to 10 mass parts in the case of containing the maleic acid-modified polyethylene; and 15 to 30 mass parts of the bromine-based flame retardant, 5 to 15 mass parts of antimony trioxide, 6 to 12 mass parts of the benzimidazole-based aging retardant, 2 to 4 mass parts of the phenol-based aging retardant, 2 to 4 mass parts of the thioether-based aging retardant, 0.5 to 2 mass parts of the copper inhibitor and 3 to 6 mass parts of the crosslinking aid are contained with respect to 100 mass parts of the total amount of the resin.

<Method of Producing of Resin Composition>

The resin composition of the present invention can be obtained by preparing the above-described components (A) to (H), and further the above-described optional components as needed, and melt-mixing the components using an ordinarily kneading equipment such as a batch-type kneader such as a roll, a kneader, a Banbury mixer and the like, or a twin-screw extruder.

<Vehicle Wire Harness>

The vehicle wire harness of the present invention has a layer composed of a resin-coating material obtained by crosslinking the resin composition of the present invention, on the surface of a conductor (including a conductor bundle and a fiber core wire). Meanwhile, the vehicle wire harness of the present invention may have an interlayer or a shielding layer between the conductor and the layer composed of a resin-coating material.

<Method of Producing Vehicle Wire Harness>

The method of producing the vehicle wire harness of the present invention includes a step of irradiating electron beams of 80 to 250 kGy to a resin composition for vehicle wire harness that contains from 90 to 100 mass parts of an ethylene-vinyl acetate (A), from 15 to 30 mass parts of a bromine-based flame retardant (B), from 5 to 15 mass parts of antimony trioxide (C), from 6 to 12 mass parts of a benzimidazole-based aging retardant (D), from 2 to 4 mass parts of a phenol-based aging retardant (E), from 2 to 4 mass parts of a thioether-based aging retardant (F), from 0.5 to 2 mass parts of a copper inhibitor (G), and from 3 to 6 mass parts of a crosslinking aid (H).

The vehicle wire harness of the present invention can be produced by extrusion-coating the resin composition of the present invention on the periphery of a conductor. The conductor may be a single wire (or solid wire) or a stranded wire, and may be a bare wire or a tin-plated or enamel-coated wire. Examples of the conductor-forming metal materials include an annealed copper, a copper alloy, and aluminum. The thickness of the layer composed of the resin-coating material that is formed on the periphery of the conductor is not particularly limited. However, usually it is about 0.15 mm to about 5 mm.

The diameter and the material of the conductor, the thickness of the coating layer, etc. are not particularly limited, and are appropriately determined according to its intended use. The above-described step of irradiating electron beams is preferably performed after extrusion-coating. The electron beam crosslinking can be carried out by ordinarily methods and conditions, and is not limited. The electron beam-irradiation conditions are preferably from 50 to 450 kGy, more preferably from 80 to 250 kGy, further preferably from 80 to 200 kGy, and particularly preferably from 80 to 160 kGy, in terms of irradiance level.

Further, a multilayer structure formed by providing, for example, an interlayer or a shielding layer between a conductor and a coating layer or between coating layers may be adopted.

The method of producing the vehicle wire harness of the present invention is preferably a method of producing the vehicle wire harness that includes a step of extrusion-coating a resin composition on a conductor to thereby provide a coating layer thereon, and then irradiating electron beams of 80 to 250 kGy to the coating layer, in which:

the resin composition contains a resin, a flame retardant, an aging retardant, a copper inhibitor and a crosslinking aid, the resin is composed of (1) an ethylene-vinyl acetate copolymer, (2) a combination of an ethylene-vinyl acetate copolymer and a maleic acid-modified polyethylene or (3) a combination of an ethylene-vinyl acetate copolymer, a maleic acid-modified polyethylene and a low density polyethylene, when the total amount of the resin is taken as 100 mass parts, the content of the ethylene-vinyl acetate copolymer is from 90 to 100 mass parts, and in the case of containing the maleic acid-modified polyethylene, the content of the maleic acid-modified polyethylene is from 1 to 10 mass parts, and the resin composition contains, with respect to 100 mass parts of the total amount of the resin, from 15 to 30 mass parts of a bromine-based flame retardant, from 5 to 15 mass parts of antimony trioxide, from 6 to 12 mass parts of a benzimidazole-based aging retardant, from 2 to 4 mass parts of a phenol-based aging retardant, from 2 to 4 mass parts of a thioether-based aging retardant, from 0.5 to 2 mass parts of the copper inhibitor and from 3 to 6 mass parts of the crosslinking aid.

The conditions for extrusion-forming the resin composition of the present invention are not particularly limited, as long as the resin composition of the present invention can be extruded. However, from the points that a load on an extruder (extrusion machine) can be lowered and a shape retaining property can be secured, an extruding temperature (head part) is preferably from 100 to 230° C., and more preferably from 120 to 200° C.

Further, as the other conditions for the extrusion-formation, normal conditions can be appropriately set without any particular limitation. Although the extrusion rate (extrusion linear speed) is not limited, the present invention is particularly excellent for high speed extrusion, whereby productivity is improved.

The screw configuration of the extruder is not particularly limited and ordinarily full flight screw, double flight screws, tip-double flight screw, maddock screw and the like may be used.

Any shape and materials of the conductor may be good, as long as these are the shape and materials (copper, aluminum, etc.) generally used for the vehicle wire harness.

Further, the thickness of the coating layer is not particularly limited. In the case of using the resin composition of the present invention, even if the thickness of the coating layer thereof is thinned, there are advantages that insulated wires being excellent in flexibility, hardness, degree of cross-linkage, flame retardancy, cold resistance and weather resistance can be obtained.

EXAMPLES

The present invention will be described in more detail based on examples and comparative examples given below, but the invention is not meant to be limited by these.

Examples 1 to 10 and Comparative Examples 1 to 12

The materials for preparing the resin compositions according to Examples 1 to 10 and Comparative Examples 1 to 12 are shown in Table 1.

Details of the materials used are as follows. Meanwhile, the component (number) corresponds to the description in the following Table 1. For example, component (1) indicates (1) Ethylene-vinyl acetate copolymer in the following Table 1.

<Used Materials>
Ethylene-Vinyl Acetate Copolymer (A)
Component (1): EVAFLEX V5274 (trade name), manufactured by DUPONT-MITSUI POLYCHEMICALS CO., LTD
Vinyl acetate constituent: 17 mass %
Component (2): EVAFLEX V422 (trade name), manufactured by DUPONT-MITSUI POLYCHEMICALS CO., LTD
Vinyl acetate constituent: 20 mass %
Component (3): EVAFLEX EV40LX (trade name), manufactured by DUPONT-MITSUI POLYCHEMICALS CO., LTD.
Vinyl acetate constituent: 41 mass %
Bromine-Based Flame Retardant (B)
Component (8): 1,2-Bis(pentabromophenyl)ethane, SAYTEX 8010 (trade name), manufactured by Albemarle Corporation
Antimony Trioxide (C)
Component (9): PATOX-C (trade name), manufactured by NIHON SEIKO CO., LTD.
Benzimidazole-Based Aging Retardant (D)
Component (11): Zinc salt of 2-sulfanyl benzimidazole, NOCRAC MBZ (trade name), manufactured by OUCHI SHINKO CHEMICAL INDUSTRIAL CO., LTD.
Phenol-Based Aging Retardant (E)
Component (12): Hindered phenol-based aging retardant, IRGANOX 1010 (trade name), manufactured by BASF
Thioether-Based Aging Retardant (F)
Component (13): ADKSTAB AO-412S (trade name), manufactured by ADEKA
Copper Inhibitor (G)
Component (14): IRGANOX MD1024 (trade name), manufactured by BASF
Crosslinking Aid (H)
Component (16): Trimethylol propane methacrylate, Ogmont T200 (trade name), manufactured by Shin-Nakamura Chemical Co., Ltd
Maleic Acid-Modified Polyethylene (I)
Component (4): ADTEX L6100M (trade name, manufactured by Japan Polyolefins Co., Ltd.)
Lubricant
Component (17): Zinc distearate, SHINACA LEAD ZS-101 (trade name), manufactured by Shinagawa Chemical industries Co., Ltd.
Other Components
Component (5): Linear low density polyethylene (LLDPE), NOVATEC UE320 (trade name), manufactured by Japan Polyethylene Corporation
Component (6): Very low density polyethylene (VLDPE), ENGAGE 8440 (trade name), manufactured by Dow Elastomers
Component (7): HI-ZEX 5305E (trade name), manufactured by Prime Polymer Co., Ltd.
Component (10): KISUMA 5L (trade name, silane-surface treated), manufactured by Kyowa Chemical Industry Co., Ltd.
Component (15): Zinc sulfide (trade name), manufactured by SachtolithHD-S Sachtleben Chemie

[Preparation of Resin Composition Pellet]

Components in accordance with the compositions shown in the following Table 1 were melt-mixed at 180° C. using a 1.7 L-Banbury mixer, and then the mixture was ejected and pelletized through an extruder to thereby obtain resin composition pellets of Examples 1 to 10 and Comparative Examples 1 to 12.

[Production of Insulated Wire and Sheet]

Each resin composition pellet obtained in the above was extrusion-coated on a conductor using an extruder whose temperature was set to a range of 130 to 190° C., and then the coating layer was crosslinked by electron beams to thereby prepare respectively two kinds of insulated wires of the following (i) and (ii). Further, each resin composition pellet obtained in the above was pressed under additional pressure (pressure 100 tons) at 160° C. to thereby form it in the form of a sheet with an area of 280 $cm^2$, and then the sheet obtained in this way was crosslinked by electron beams to thereby prepared the sheet (iii). Meanwhile, as the conductor, a bare annealed copper wire (composition: 37 wires/strand diameter 0.32 mm, 19 wires/39 wires/strand diameter 0.32 mm) was used.

Herein, the crosslinking using the electron beam was conducted at the accelerating voltage of 1000 keV, under the condition of 80, 120 or 160 kGy.

(i) About 10 m-long insulated wire having an extrusion-coating with a thickness of 0.7 mm on the copper conductor of 3.0 mm² in cross-section area
(ii) About 10 m-long insulated wire having an extrusion-coating with a thickness of 1.6 mm on the copper conductor of 60 mm² in cross-section area
(iii) 2 mm-thick, 50 mm-long and 50 mm-wide press-forming sheet

[Test]

(Processing Adhesion)

The adhesion to a Banbury mixer at the time of mixing using the Banbury mixer was evaluated according to the following criteria. "A" and "B" are a pass level of this test.
—Evaluation Criteria—
A: The kneaded compound was not remained in the processing machine.
B: The kneaded compound remained in the processing machine was 1 mass % or more and less than 2 mass % of the raw material.
C: The kneaded compound remained in the processing machine was 2 mass % or more and 5 mass % or less of the raw material.

(5% Modulus)

Using the insulated wire of the above-described (i), evaluation was conducted according to the following criteria in conformity of Japanese Industrial Standards (JIS) K 7161. The tension rate was set to 200 mm/min at room temperature (23° C.) and the tensile strain that is the increment of a gauge distance divided by the gauge distance under this condition was defined as 5% modulus. "A" and "B" are a pass level of this test.
—Evaluation Criteria—
A: 5% modulus was less than 3 MPa.
B: 5% modulus was 3 MPa or more and less than 5 MPa.
C: 5% modulus was 5 MPa or more.

(Hardness)

Using the formed sheet of the above-described (iii), evaluation was conducted according to the following criteria in conformity of Japanese Industrial Standards (JIS) K 7215. As the measuring sample, 3 sheets were stacked to make the thickness 6 mm. As the tester, a type-D durometer was used. "A" and "B" are a pass level of this test.
—Evaluation Criteria—
A: HDD was less than 40.
B: HDD was 40 or more and less than 50.
C: HDD was 50 or more.

(Gel Fraction)

0.1 g of the layer composed of the resin-coating material of the insulated wire of the above-described (i) was taken to use as a sample. The test was conducted according to the method subscribed in Japanese Automobile Standards Organization (JASO) standard D618 6.14.2. The sample was put into a test tube and 20 mL of xylene was added thereto and the content was heated at 120° C. for 24 hours. After that, the sample was taken out and was dried for 6 hours within a 100° C. dry oven and then was allowed to cool until a normal temperature (23° C.), and thereafter its mass was weighed accurately. Gel fraction was defined with the percentage of a sample mass after drying from xylene immersion with respect to a sample mass before the xylene immersion ((sample mass after drying from xylene immersion/sample mass before xylene immersion)×100). "A" and "B" are a pass level of this test.
—Evaluation Criteria—
A: Gel fraction was 60% or more.
B: Gel fraction was 50% or more and less than 60%.
C: Gel fraction was less than 50%.

(Abrasion Resistance A)

The abrasion resistance test (Scrape abrasion test) was conducted according to the method specified by Japanese Automobile Standards Organization (JASO) D618 6.7.2.

1 m of sample was taken from the insulated wire of the above-described (i) and 25 mm of the insulator was removed from one edge thereof.

The test was performed on this sample by adding 7N load to a needle (material: stainless steel) with a diameter of 0.45 mm. Details of the test conditions are described below.
Operating speed: 55 cycle/min (one reciprocation is defined as one cycle)
Movement of needle (needle travel distance): 20 mm
Abrasion length: 15.5 mm
Test temperature: 23° C.

The test was performed in this way and the abrasion resistance A was evaluated based on the following criteria. "A" and "B" are a pass level of this test.
—Evaluation Criteria—
A: The cycle count until the needle was brought into contact with the conductor was 2000 cycles (times) or more.
B: The cycle count until the needle was brought into contact with the conductor was 750 cycles (times) or more and less than 2000 cycles (times).
C: The cycle count until the needle was brought into contact with the conductor was less than 750 cycles (times).

(Abrasion Resistance B)

The abrasion resistance test (Tape abrasion test) was conducted according to the method specified by Japanese Automobile Standards Organization (JASO) D618 6.7.1.

A 1 m-long sample was taken from the insulated wire of the above-described (ii) and 25 mm of a layer composed of a resin-coating material was removed from both edges thereof. The test was performed on this sample by using Alumina No. 180 (25 mm wide) as a wear tape so that the wear tape is brought into contact with the sample by a pressing force of 0.63N with an additional load of 1.9 kg. The test results were evaluated based on the following criteria. "A" and "B" are a pass level of this test.
—Evaluation Criteria—
A: The movement distance of the tape until the conductor was exposed was 4500 mm or more.
B: The movement distance of the tape until the conductor was exposed was 3430 mm or more and less than 4500 mm.
C: The movement distance of the tape until the conductor was exposed was less than 3430 mm.

(Flame Retardancy)

A horizontal burning test was performed by using 300 mm-long electric wire samples cut from the insulated wires of the above-described (i) and (ii) according to the method subscribed in Japan Automotive Standards Organization (JASO) standard D 618 6.13. An end of a reducing flame using a Bunsen burner having a diameter of 10 mm was brought into contact with a lower side of the central part of the sample for 30 seconds, and then the flame was gently removed. Thereafter, flame-remaining time until the flame went out was measured, and were evaluated based on the following criteria. "A" and "B" are a pass level of this test.
—Evaluation Criteria—
A: The flame disappeared immediately.
B: The flame did not disappear immediately, but the flame-remaining time was within 30 seconds.
C: The flame-remaining time exceeded 30 seconds.

(Cold Resistance)

The cold resistance test was performed by using the insulated wire of the above-described (i) in conformity to the Japanese Industrial Standard (JIS) K 7216. The test results were evaluated based on the following criteria. "A" and "B" are a pass level of this test.

—Evaluation Criteria—
A: The temperature at which the insulated wire was not separated into 2 parts or more was −50° C. or less.
B: The temperature at which the insulated wire was not separated into 2 parts or more was −40° C. or less and more than −50° C.
C: The temperature at which the insulated wire was not separated into 2 parts or more was more than −40° C.

The expression "the insulated wire was separated" means that the specimen was separated into 2 parts or more.

(Heat Resistance)

The heat resistance was evaluated by the continuous heat resistance temperature according to the method subscribed in the Japan Automotive Standards Organization (JASO) standard D 618 and D 624. Specifically, an aging test was performed at each temperature of 170° C., 180° C., 190° C., and 200° C. A time until the tensile elongation falls below 100% was measured. By an Arrhenius plot made, the temperature at which 100% elongation was secured in 10,000 hours was measured and defined as the heat resistant life. The test results were evaluated based on the following criteria. "A" and "B" are a pass level of this test.

—Evaluation Criteria—
A: The temperature was more than 151° C.
B: The temperature was more than 150° C. and less than 151° C.
C: The temperature was less than 150° C.

The results obtained are shown collectively in the following Table 1.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| (1) Ethylene-vinyl acetate copolymer | 100 | 90 | 90 | 90 | 90 | 90 | — | — | — | 95 |
| (2) Ethylene-vinyl acetate copolymer | — | — | — | — | — | — | 90 | 90 | 90 | — |
| (3) Ethylene-vinyl acetate copolymer | — | — | — | — | — | — | — | — | — | — |
| (4) Maleic acid-modified polyethylene | — | 10 | 10 | 10 | 10 | 10 | 5 | 10 | 10 | 5 |
| (5) Low density polyethylene | — | — | — | — | — | — | 5 | — | — | — |
| (6) Ethylene-octene copolymer | — | — | — | — | — | — | — | — | — | — |
| (7) High density polyethylene | — | — | — | — | — | — | — | — | — | — |
| (8) Bromine-based flame retardant | 30 | 25 | 30 | 30 | 30 | 30 | 30 | 30 | 24 | 25 |
| (9) Antimony trioxide | 15 | 8 | 10 | 10 | 10 | 10 | 10 | 10 | 12 | 8 |
| (10) Magnesium hydroxide | — | — | — | — | — | — | — | — | — | — |
| (11) Benzimidazole-based aging retardant | 12 | 12 | 12 | 12 | 12 | 12 | 10 | 12 | 7 | 8 |
| (12) Phenol-based aging retardant | 4 | 3 | 3 | 3 | 3 | 3 | 3 | 4 | 2 | 2 |
| (13) Thioether-based aging retardant | 3 | 1 | 2 | 2 | 2 | 2 | 4 | 2 | 4 | 4 |
| (14) Copper inhibitor | 1 | 1 | 1.5 | 1.5 | 1.5 | 2 | 2 | 2 | 2 | 2 |
| (15) Zinc compound | 4 | 4 | — | — | — | — | — | — | 5 | — |
| Total amount of the aging retardants (antioxidants) (11) to (15) | 24 | 21 | 18.5 | 18.5 | 18.5 | 19 | 19 | 22 | 25 | 16 |
| (16) Crosslinking aid | 4 | 4 | 5 | 3 | 3 | 6 | 5 | 3 | 6 | 4 |
| (17) Lubricant | 1 | 1 | 1 | 1 | 1 | 1 | 1 | 1 | 1 | 1 |
| Irradiance level (kGy) | 80 | 80 | 80 | 120 | 160 | 80 | 80 | 80 | 80 | 80 |
| Processing adhesion | A | B | B | B | B | B | A | B | B | A |
| 5% modulus | A | A | A | A | A | A | A | A | A | A |
| Hardness (duro D) | A | B | B | B | B | B | B | B | B | A |
| Gel fraction | A | A | A | A | A | A | A | A | A | A |
| Abrasion resistance A (Scrape abrasion test) | B | A | A | A | A | A | A | A | A | A |
| Abrasion resistance B (Tape abrasion test) | B | A | A | A | A | A | A | A | A | A |
| Flame retardancy | A | B | A | A | A | A | A | A | A | A |
| Cold resistance | A | A | A | A | A | A | A | A | A | A |
| Heat resistance | A | A | A | B | B | A | A | A | A | A |

|  | CEx. 1 | CEx. 2 | CEx. 3 | CEx. 4 | CEx. 5 | CEx. 6 | CEx. 7 | CEx. 8 | CEx. 9 | CEx. 10 | CEx. 11 | CEx. 12 |
|---|---|---|---|---|---|---|---|---|---|---|---|---|
| (1) Ethylene-vinyl acetate copolymer | 100 | 70 | — | — | — | — | 30 | — | — | — | — | 30 |
| (2) Ethylene-vinyl acetate copolymer | — | — | 70 | 90 | — | — | — | — | 30 | 100 | — | — |
| (3) Ethylene-vinyl acetate copolymer | — | — | — | — | 80 | — | — | — | — | — | 60 | — |
| (4) Maleic acid-modified polyethylene | — | 30 | 30 | 10 | 20 | — | — | — | — | — | 35 | — |
| (5) Low density polyethylene | — | — | — | — | — | 100 | 70 | — | — | — | 5 | 20 |
| (6) Ethylene-octene copolymer | — | — | — | — | — | — | — | 100 | 70 | — | — | — |
| (7) High density polyethylene | — | — | — | — | — | — | — | — | — | — | — | 50 |
| (8) Bromine-based flame retardant | 30 | 30 | 30 | — | — | 25 | 25 | 25 | 25 | 30 | 8 | 25 |
| (9) Antimony trioxide | 50 | 50 | 15 | — | — | 8 | 8 | 8 | 8 | 10 | 25 | 8 |
| (10) Magnesium hydroxide | 50 | 50 | — | 90 | 50 | — | — | — | — | — | — | — |
| (11) Benzimidazole-based aging retardant | 6 | 12 | 6 | 12 | 12 | 2 | 6 | 10 | 6 | 12 | 12 | 12 |
| (12) Phenol-based aging retardant | 3 | 4 | 2 | 4 | 4 | 2 | 1 | 1 | 1 | 6 | 4 | 6 |
| (13) Thioether-based aging retardant | — | — | 1 | 3 | 3 | 0.5 | — | 0.5 | — | 12 | 3 | 12 |
| (14) Copper inhibitor | — | — | 2 | 1 | 1 | 6 | — | 0.5 | — | 3 | 1 | 3 |
| (15) Zinc compound | — | — | — | 4 | 4 | — | — | — | — | 4 | 4 | 4 |
| Total amount of the aging retardants (antioxidants) (11) to (15) | 9 | 16 | 11 | 24 | 24 | 10.5 | 7 | 12 | 7 | 37 | 24 | 37 |
| (16) Crosslinking aid | 5 | 3 | 3 | 3 | 1 | 3 | 3 | 6 | 1 | 4 | 5 | 1 |
| (17) Lubricant | 1 | 1 | 1 | 1 | 1 | 1 | 1 | 1 | 1 | 1 | 1 | 1 |
| Irradiance level (kGy) | 80 | 80 | 80 | 80 | 80 | 80 | 80 | 80 | 80 | 80 | 80 | 80 |

TABLE 1-continued

| | | | | | | | | | | | | |
|---|---|---|---|---|---|---|---|---|---|---|---|---|
| Processing adhesion | B | C | C | B | C | A | A | B | B | B | C | A |
| 5% modulus | C | C | C | C | A | C | C | A | A | A | A | C |
| Hardness (duro D) | C | C | C | C | A | C | C | A | A | A | A | C |
| Gel fraction | A | B | B | B | C | C | C | C | C | A | B | C |
| Abrasion resistance A (Scrape abrasion test) | C | B | A | B | C | A | A | C | C | C | B | A |
| Abrasion resistance B (Tape abrasion test) | C | C | B | C | C | A | B | C | C | C | C | A |
| Flame retardancy | A | A | A | B | C | C | B | C | B | C | C | C |
| Cold resistance | B | B | B | C | C | A | A | A | A | C | B | B |
| Heat resistance | C | C | C | A | A | C | C | C | C | A | A | A |

Remarks: 'Ex.' means Example according to this invention.
Remarks: 'CEx.' means Comparative Example.
<Notes in Tables>
The content of each component in Tables is based on a mass part. The expression "—" means that the corresponding component is not included.

From the results in Table 1, in the resin compositions that do not satisfy the definitions of the present invention, at least three evaluation items were the unacceptable level.

In contrast, it is apparent from the results in Table 1 that evaluation items about the insulated wires or sheets prepared using the resin composition of the present invention were all acceptable level. From this, it is understood that the resin composition of the present invention can be used preferably as a resin-coating material layer of the insulated wire (vehicle wire harness) that satisfies the prescription of JASO D 624 (2015) heat resistance class 150° C. and ISO 6722 (2006) heat resistance class D.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A resin composition, comprising:
an ethylene-vinyl acetate copolymer (A); and
15 to 30 mass parts of a bromine-based flame retardant (B), 5 to 15 mass parts of antimony trioxide (C), 6 to 12 mass parts of a benzimidazole-based aging retardant (D), 2 to 4 mass parts of a phenol-based aging retardant (E), 2 to 4 mass parts of a thioether-based aging retardant (F), 0.5 to 2 mass parts of a copper inhibitor (G), and 3 to 6 mass parts of a crosslinking aid (H), with respect to 90 to 100 mass parts of the ethylene-vinyl acetate copolymer (A).

2. The resin composition according to claim 1, comprising 1 to 10 mass parts of a maleic acid-modified polyethylene (I).

3. The resin composition according to claim 1, which is the resin composition is a resin composition for a resin-coating material layer of an insulated wire.

4. The resin composition according to claim 1, wherein the ethylene-vinyl acetate copolymer (A) is any one of (1) an ethylene-vinyl acetate copolymer, (2) a combination of an ethylene-vinyl acetate copolymer and a maleic acid-modified polyethylene, and (3) a combination of an ethylene-vinyl acetate copolymer, a maleic acid-modified polyethylene and a low-density polyethylene.

5. The resin composition according to claim 4, the content of the ethylene-vinyl acetate copolymer (A) is 90 to 100 mass parts when the total amount of the resin of the resin composition is taken as 100 mass parts, and in the case of containing the maleic acid-modified polyethylene, the content of the maleic acid-modified polyethylene is 1 to 10 mass parts.

6. The resin composition according to claim 1, which is used for a vehicle wire harness.

7. A resin-coating material obtained by crosslinking the resin composition according to claim 1.

8. A vehicle wire harness, comprising a layer composed of the resin-coating material according to claim 7.

9. A method of producing of a vehicle wire harness, which comprises a step of irradiating electron beams of 80 to 250 kGy to a resin composition;
wherein the resin composition comprises from 90 to 100 mass parts of an ethylene-vinyl acetate (A), from 15 to 30 mass parts of a bromine-based flame retardant (B), from 5 to 15 mass parts of antimony trioxide (C), from 6 to 12 mass parts of a benzimidazole-based aging retardant (D), from 2 to 4 mass parts of a phenol-based aging retardant (E), from 2 to 4 mass parts of a thioether-based aging retardant (F), from 0.5 to 2 mass parts of a copper inhibitor (G), and from 3 to 6 mass parts of a crosslinking aid (H).

10. The method of producing of a vehicle wire harness according to claim 9, comprising a step of irradiating electron beams of 80 to 250 kGy to a resin composition after extrusion-coating of the resin composition on the periphery of a conductor to provide a coating material layer.

11. The method of producing of a vehicle wire harness according to claim 9, wherein the ethylene-vinyl acetate copolymer (A) is any one of (1) an ethylene-vinyl acetate copolymer, (2) a combination of an ethylene-vinyl acetate copolymer and a maleic acid-modified polyethylene, and (3) a combination of an ethylene-vinyl acetate copolymer, a maleic acid-modified polyethylene and a low-density polyethylene.

12. The method of producing of a vehicle wire harness according to claim 9, the content of the ethylene-vinyl acetate copolymer (A) is 90 to 100 mass parts when the total amount of the resin of the resin composition is taken as 100 mass parts, and in the case of containing the maleic acid-modified polyethylene, the content of the maleic acid-modified polyethylene is 1 to 10 mass parts.

* * * * *